(12) United States Patent
Wright

(10) Patent No.: US 9,399,954 B2
(45) Date of Patent: Jul. 26, 2016

(54) IGNITION EXCITER DISCHARGE SWITCH

(71) Applicant: Unison Industries, LLC, Jacksonville, FL (US)

(72) Inventor: Scott Brian Wright, Ponte Vedra Beach, FL (US)

(73) Assignee: UNISON INDUSTRIES, LLC, Jacksonville, FL (US)

( * ) Notice: Subject to any disclaimer, the term of this patent is extended or adjusted under 35 U.S.C. 154(b) by 201 days.

(21) Appl. No.: 14/215,317

(22) Filed: Mar. 17, 2014

(65) Prior Publication Data

US 2015/0260107 A1   Sep. 17, 2015

(51) Int. Cl.
| | |
|---|---|
| F02P 3/04 | (2006.01) |
| F02C 7/266 | (2006.01) |
| H01T 15/00 | (2006.01) |
| F02P 3/08 | (2006.01) |
| F02P 15/00 | (2006.01) |

(52) U.S. Cl.
CPC ............ F02C 7/266 (2013.01); F02P 3/0884 (2013.01); F02P 15/003 (2013.01); H01T 15/00 (2013.01); F05D 2220/32 (2013.01); F05D 2260/42 (2013.01); F05D 2260/99 (2013.01)

(58) Field of Classification Search
CPC ........ F02C 7/266; F02P 15/003; H01T 15/00; F05D 2260/42; F05D 2260/99; F05D 2220/32
USPC .................. 123/596, 605, 618; 361/247, 253
See application file for complete search history.

(56) References Cited

U.S. PATENT DOCUMENTS

| | | |
|---|---|---|
| 5,656,966 A | 8/1997 | Wilmot et al. |
| 8,266,885 B2 | 9/2012 | Wright |
| 8,359,869 B2 | 1/2013 | Wright |
| 8,981,819 B2 * | 3/2015 | Dunipace ................. H03K 3/00 327/109 |
| 2003/0067284 A1 | 4/2003 | Costello |
| 2003/0179021 A1 * | 9/2003 | Braun .................. H03K 17/063 327/108 |
| 2012/0262220 A1 * | 10/2012 | Springett ......... H03K 17/04206 327/430 |
| 2014/0035627 A1 * | 2/2014 | Dunipace ............... H03K 3/012 327/109 |

FOREIGN PATENT DOCUMENTS

| | | |
|---|---|---|
| EP | 0369236 A2 | 5/1990 |
| EP | 0634572 A1 | 1/1995 |

OTHER PUBLICATIONS

Elasser et al., "3KV 4H-SiC Thyristors for Pulsed Power Applications", Materials Science Forum, vol. No. 645-648, pp. 1053-1056, Apr. 29, 2010.
Sundaresan et al., "Integrated SiC Anode Switched Thyristor Modules for Smart-Grid Applications", Materials Science Forum, vol. No. 717-720, pp. 1159-1162, May 14, 2012.
European Search Report and Opinion issued in connection with corresponding EP Application No. 15159494.2 on Aug. 27, 2015.
Aviation High School, The Fuel & Ignition Systems of a Gas Turbine Engine, Information Sheet, Dec. 2007, Revision H.

* cited by examiner

*Primary Examiner* — Hai Huynh
(74) *Attorney, Agent, or Firm* — GE Global Patent Operation; William S. Munnerlyn

(57) ABSTRACT

An ignition exciter system for igniting fuel in a gas turbine engine. The ignition exciter system includes a rechargeable energy source, at least one pulse-forming network coupled to the rechargeable energy source and generating a stored energy waveform from energy in the rechargeable energy source, at least one igniter plug coupled to the at least one pulse-forming network to receive the stored energy waveform and generating a spark in response to the received stored energy waveform.

12 Claims, 3 Drawing Sheets ly and releases a high-energy spark to produce combustion of fuel in the engine in a way that is analogous to automobile ignition coils. The ignition exciter may provide sparks during initial engine start on the ground or, depending upon the environmental conditions, while the aircraft is airborne to prevent combustion from failing.
IGNITION EXCITER DISCHARGE SWITCH

BACKGROUND OF THE INVENTION

Gas turbine engines for aircraft typically include an ignition system to aid in the starting of the engine. The engine ignition system may include an ignition exciter that stores energy and releases a high-energy spark to produce combustion of fuel in the engine in a way that is analogous to automobile ignition coils. The ignition exciter may provide sparks during initial engine start on the ground or, depending upon the environmental conditions, while the aircraft is airborne to prevent combustion from failing.

BRIEF DESCRIPTION OF THE INVENTION

In one aspect, an embodiment of the invention relates an ignition exciter system for igniting fuel in a gas turbine engine. The ignition exciter system comprises a rechargeable energy source, at least one pulse-forming network coupled to the rechargeable energy source and generating a stored energy waveform from energy in the rechargeable energy source, at least one igniter plug coupled to the at least one pulse-forming network to receive the stored energy waveform and generating a spark in response to the received stored energy waveform, a silicon carbide discharge switch further comprising a gate, an anode and a cathode and a switch driver applying a positive electrical triggering waveform to the anode with respect to the gate of the silicon carbide discharge switch. The anode and cathode of the silicon carbide discharge switch is connected in series with the rechargeable energy source selectively coupling the rechargeable energy source to the at least one pulse forming network in response to the positive electrical triggering waveform to effect the generating of the stored energy waveform, which is then received by the igniter plug to generate the spark.

DETAILED DESCRIPTION OF THE INVENTION

Figure 1:
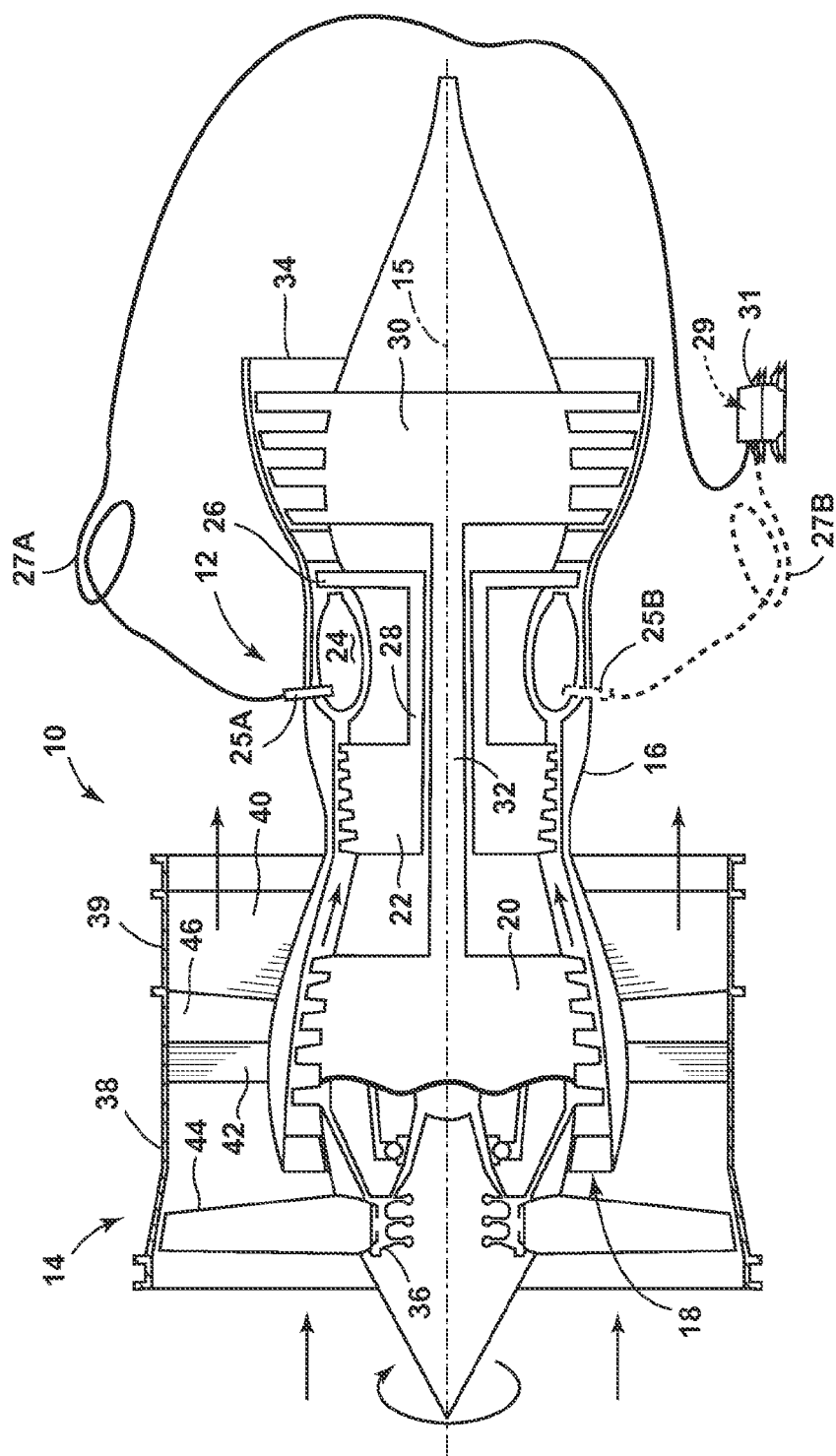
FIG. 1 is a schematic view of an exemplary gas turbine engine that includes a core engine section positioned axially downstream from a fan section along a longitudinal axis and an engine ignition system according to an embodiment of the present invention.

FIG. 1 is a schematic view of an exemplary gas turbine engine 10 that includes a core engine section 12 positioned axially downstream from a fan section 14 along a longitudinal axis 15. The core engine section 12 includes a generally tubular outer casing 16 that defines an annular core engine inlet 18 and that encloses and supports a pressure booster 20 for use in raising the pressure of the air that enters the core engine section 12 to a first pressure level. A high-pressure, multi-stage, axial-flow compressor 22 receives pressurized air from the booster 20 and further increases the pressure of the air. The pressurized air flows to a combustor 24 where fuel is injected into the pressurized air stream to raise the temperature and energy level of the pressurized air. One or more igniter plugs 25A and 25B coupled via lead lines 27A and 27B to an ignition exciter circuit 29 may facilitate the initiation of combustion of the fuel air mixture in the combustor 24. The ignition exciter circuit 29 is additionally coupled to a DC power source via a power source connector 31. The high energy combustion products flow to a first turbine 26 for use in driving the compressor 22 through a first drive shaft 28, and then to a second turbine 30 for use in driving the booster 20 through a second drive shaft 32 that is coaxial with the first drive shaft 28. After driving each of the turbines 26 and 30, the combustion products provide propulsive jet thrust by being channeled from the core engine section 12 through an exhaust nozzle 34.

Surrounded by an annular fan casing 38, the fan section 14 includes a rotatable, axial-flow fan rotor 36. The fan casing 38 is supported about the core engine section 12 by a plurality of substantially radially-extending, circumferentially-spaced support struts 40. The fan casing 38 is supported by radially extending outlet guide vanes 42 and encloses the fan rotor 36 and a plurality of fan rotor blades 44. A downstream section 39 of the fan casing 38 extends over an outer portion of the core engine 12 to define a secondary, or bypass, airflow conduit 46 that provides additional propulsive jet thrust.

While shown in FIG. 1 and described above in the context of a commercial jet engine, the engine ignition system described herein is equally applicable to industrial turbine-powered applications without loss of generality. For example, gas turbine engines may drive a generator for generating electricity. Likewise, gas turbine engines may power industrial machinery for a wide range of applications. In this way, the engine ignition system may be configured and implemented for a particular gas turbine engine and corresponding commercial or industrial application accordingly. For example, a commercial aircraft engine may use a single igniter plug 25A coupled via lead lines 27A to the ignition exciter circuit 29 whereas a gas turbine engine connected to an electrical generator may use two igniter plugs 25A and 25B coupled via lead lines 27A and 27B to the ignition exciter circuit 29.

Figure 2:
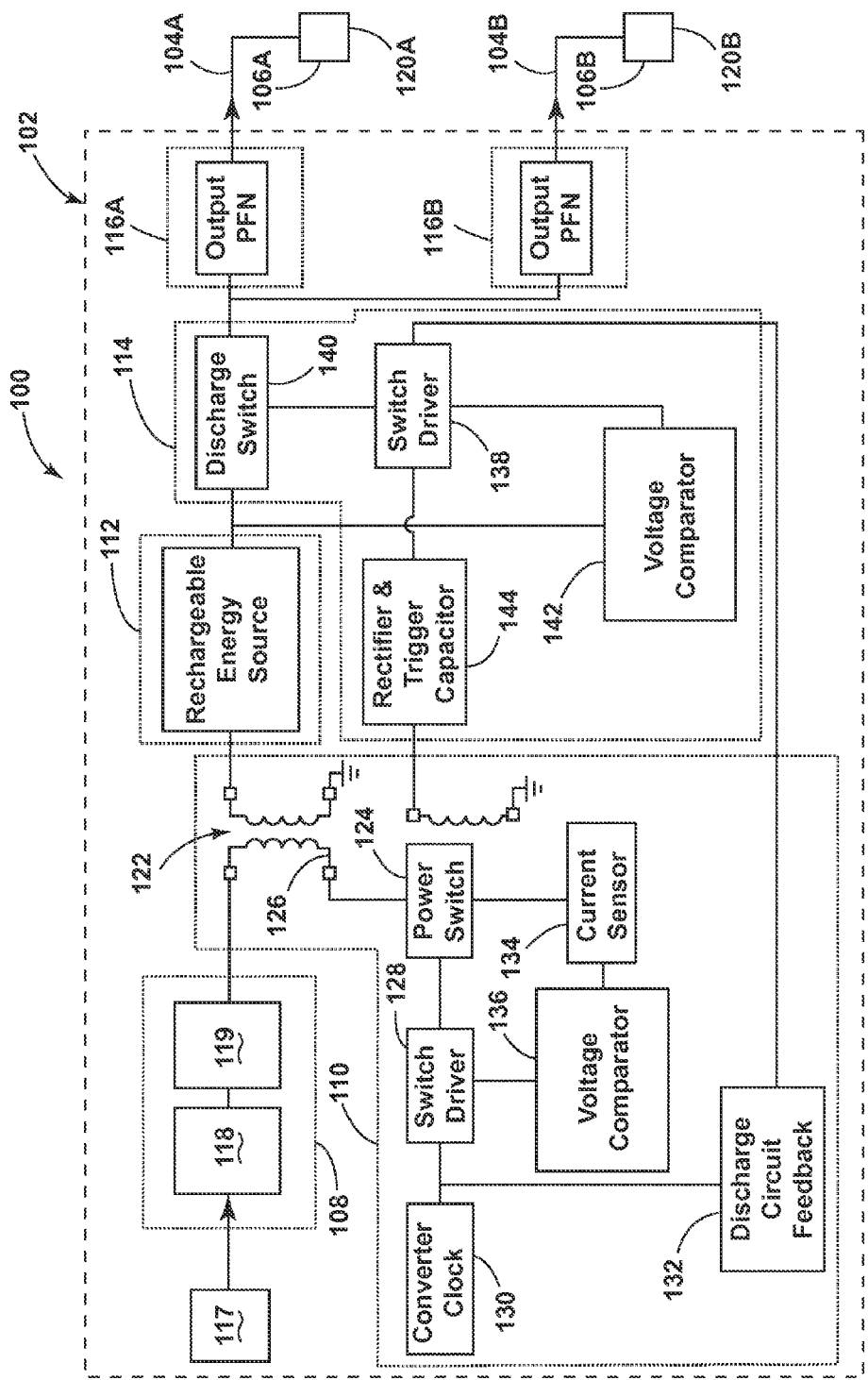
FIG. 2 is a schematic block diagram of an engine ignition system with an ignition exciter charging according to an embodiment of the present invention.

FIG. 2 is a schematic block diagram of an engine ignition system 100 with an ignition exciter charging in accordance with an embodiment of the invention. The engine ignition system 100 includes an ignition exciter circuit 102, an ignition lead 104, and an igniter plug 106. The ignition exciter circuit 102 comprises an electronic unit that includes an EMI filter module 108, a power converter 110, a rechargeable energy source 112, a voltage monitoring circuit and discharge switch module 114, and one or more pulse-forming networks (PFN) 116A and B. The EMI filter module 108 is configured to receive a supply of relatively low, direct current (DC) voltage, for example, 28 volts DC from a DC source 117. DC sources may include elements of an aircraft electrical power system including, but not limited to a battery, a DC bus line or an auxiliary power unit (APU). The source may deliver DC voltage ranging from 28 volts DC up to 270 volts DC. Alternatively, the source may provide alternating current (AC) such as 115 volts AC at a frequency of 400 Hertz (Hz).

The EMI filter module 108 includes an EMI filter 118 and a smoothing capacitor 119 configured to prevent high frequency noise generated by the ignition exciter circuit 102 from leaking through the DC power input and to protect the power converter 110 from transient voltage surges present on the DC source 117. The power converter 110 may comprise a flyback type converter and is configured to step up an input voltage received from the EMI filter module 108 to an optimal level for energy storage. The power converter 110 utilizes a charge pump technique to build up the voltage at the rechargeable energy source 112 over a number of charge cycles. When the charge cycles have built the voltage at the rechargeable energy source 112 to a predetermined level, the charge pumping is interrupted, and the rechargeable energy source 112 is controlled to discharge. Alternatively, the power converter 110 is a DC-DC converter other than a flyback type converter.

The rechargeable energy source 112 is configured to store energy between sparking events. A voltage monitoring circuit and discharge switch module 114 is configured to release the energy stored in the rechargeable energy source 112. Each PFN 116A-B is coupled to the rechargeable energy source 112 and generates a stored energy waveform from energy in the rechargeable energy source 112. Each PFN 116A-B is configured to optimize the shape and timing of the stored energy waveform for generating a spark at a respective firing tip 120A and 120B of an igniter plug 106A and 106B. Each PFN 116A-B may be an inductor but may also include a transformer and/or a high frequency capacitor to facilitate a higher output voltage or a longer duration for the resulting spark. When the ignition exciter 102 is configured with multiple output PFNs 116A-116B, the PFNs 116A-B are electrically coupled in parallel.

The ignition lead 104A-B transmits an output of the ignition exciter circuit 102 to one or more igniter plugs 106A-B that are coupled to the PFNs 116A-B. Each igniter plug 106A-B conducts the stored energy waveform from a respective ignition lead 104A-B to a firing tip 120A-B residing within the engine combustor 24 (shown in FIG. 1) to generate a spark. A geometry of the firing tip 120A-B is configured to provide a predetermined spark plume within the engine combustor 24 to ignite a fuel and air mixture, thus initiating combustion. The actual energy delivered at the igniter firing tip 120A-B is a percentage of the stored energy in the exciter (typically 25-35%). The energy contained within the spark plume, as well as the rate at which sparks are delivered to the combustor are ignition parameters. For example, typical parameters for the energy range from 4 to 20 joules (J) and the spark rate is generally around 1 to 3 hertz (Hz).

The power converter 110 includes a transformer 122 and a power switch 124 electrically coupled to a primary winding 126 of the transformer 122. The power converter 110 also includes a first switch driver 128 electrically coupled to the power switch 124. A converter clock 130 and a discharge feedback circuit 132 are electrically coupled to the switch driver 128. A current sensor 134 is electrically coupled to the power switch 124 and a voltage comparator 136.

The voltage monitoring circuit and discharge switch module 114 includes a second switch driver 138 electrically coupled to a silicon carbide discharge switch 140, a voltage comparator 142, a rectifier and a trigger capacitor module 144. The second switch driver 138 is coupled to the discharge feedback circuit 132 in the power converter 110.

Figure 3:
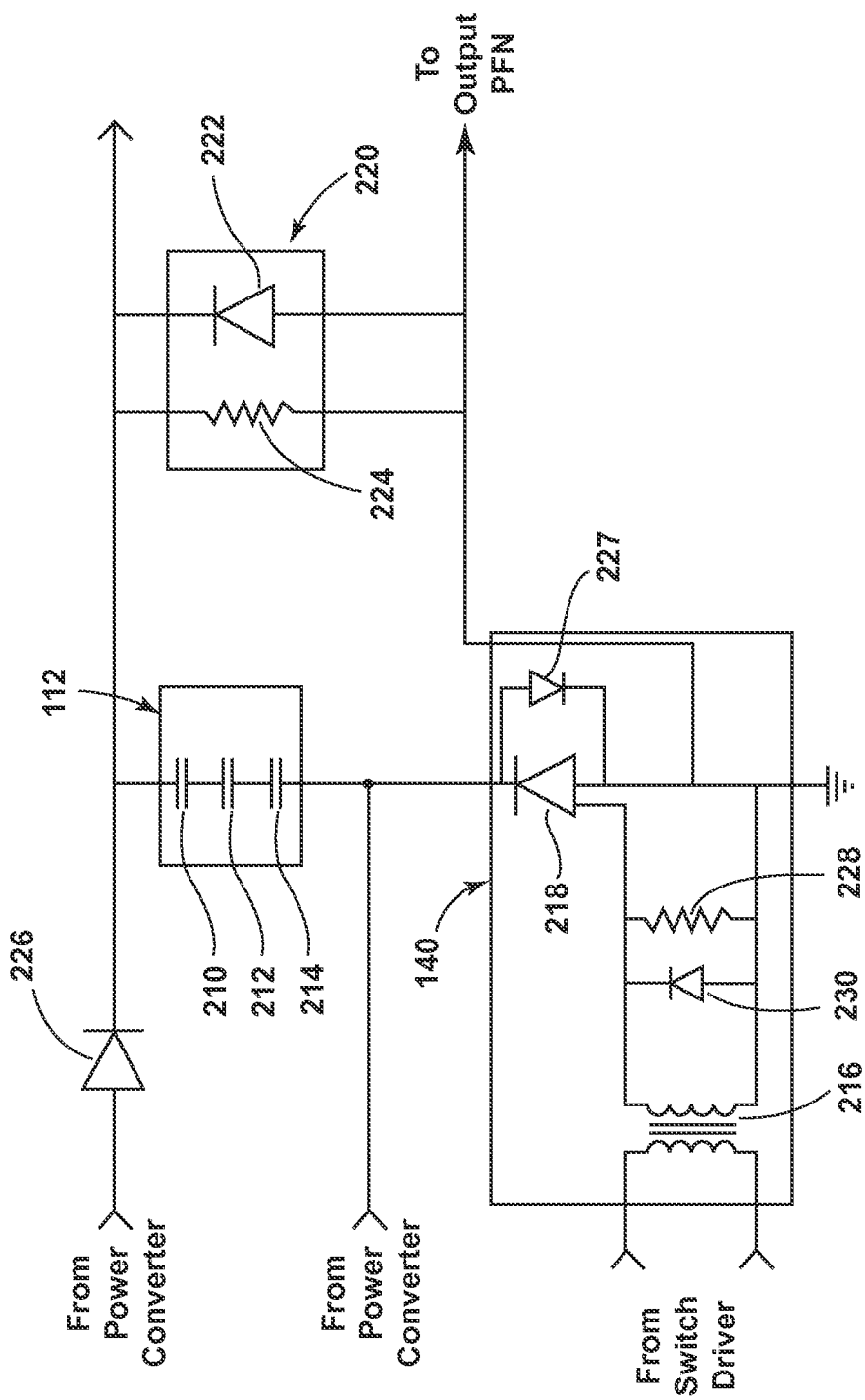
FIG. 3 is a circuit diagram illustrating the silicon carbide discharge switch and the rechargeable energy source of the ignition exciter.

FIG. 3 is a circuit diagram illustrating the silicon carbide discharge switch 140 and the rechargeable energy source 112 of the ignition exciter circuit 102. The rechargeable energy source 112, in series with a rectifier diode 226, is electrically coupled across the output of the transformer 122 of the power converter 110. The silicon carbide discharge switch 140 is electrically coupled to one side of the rechargeable energy source 112. The other side of the silicon carbide discharge switch 140 is electrically coupled to a clamper circuit 220. The clamper circuit 220 is electrically coupled across the parallel combination of one or more output PFNs 116A-B.

The rechargeable energy source 112 may include one or more energy storage or "tank" capacitors 210, 212, 214. The rechargeable energy source 112 may also include an array of storage capacitors 210, 212, 214 that may be coupled in series. In this way, the voltage across the rechargeable energy source 112 includes the additive combination of the voltage across the array of in-series capacitors 210, 212, 214. Alternatively, the capacitors may be combined in parallel to implement a rechargeable energy source where the overall capacitance is the additive combination of the capacitance of the array of capacitors.

The clamper circuit 220 includes a freewheeling diode 222. Often coupled in parallel with a resistor 224, the freewheeling diode 222 eliminates sudden voltage spikes across an inductive load when a supply voltage from the rechargeable energy source 112 is suddenly reduced or removed. In addition, it provides an efficient energy delivery path once energy is switched from the rechargeable energy source 112, through the discharge switch 140 and into the circulating path formed by the PFN 116A-B, the ignition leads 104A-B and igniter plugs 106A-B, and back through the freewheeling diode 222 as part of the timed energy release to facilitate optimal ignition.

The silicon carbide discharge switch 140 is a solid-state switch that may comprise a silicon carbide thyristor 218 with a high standoff voltage and pulse current capacity. Preferably, the solid-state silicon carbide discharge switch 140 includes a single silicon carbide thyristor 218 but multiple solid-state switches may be implemented in series depending upon the required voltage of the ignition exciter circuit 102 and the rated voltage for the switches. Additionally, the discharge switch 140 may include a clamp diode 227 coupled directly across the silicon carbide thyristor 218. The cathode of the clamp diode 227 is coupled to the anode of the silicon carbide thyristor 218 and the anode of the clamp diode 227 is coupled to the cathode of the silicon carbide thyristor 218. To electrically protect the silicon carbide thyristors 218, the clamp diode 227 provides a current path for oscillating current that could flow backward in the exciter circuit during the energy delivery, thus allowing high current flow into the gate of the silicon carbide thyristor 218 and out of the cathode of the silicon carbide thyristor 218.

The cathode of the silicon carbide thyristor 218 is coupled to the rechargeable energy source 112 and the anode of the silicon carbide thyristor is coupled to electrical ground. A second clamper circuit comprising a freewheeling diode 230 in parallel with resistor 228 is coupled in parallel to the gate and anode of the silicon carbide thyristor 218.

The silicon carbide thyristor 218 is inductively fired by way of a pulse transformer 216 coupled in parallel with both the second clamper circuit and the gate and anode of the silicon carbide thyristor 218. That is, the switch driver 138 triggers a positive electrical waveform to the anode with respect to the gate that inductively switches the discharge switch 140 to transition from a non-conducting state to a conducting state when the voltage in the storage capacitors 112 reaches a predetermined level for energy storage. In contrast, silicon semiconductor components require a positive electrical triggering waveform applied to the gate with respect to the cathode. Whereas a silicon thyristor requires extensive voltage isolation around the pulse transformer 216, grounding the anode of the silicon carbide thyristor 218 removes the requirement for high voltage isolation of an anode-gate trigger circuit. The common mode voltage applied to the anode to gate nodes may be less than 20 volts, as compared to more traditional silicon thyristor circuits that have greater than 2500 volts applied to trigger the gate to cathode nodes.

In the conducting state the anode and cathode of the silicon carbide discharge switch 140 are connected in series with the rechargeable energy source 112. In response to the positive electrical triggering waveform initiated by the switch driver 138, the discharge switch 140 couples the rechargeable energy source 112 to the PFNs 116A-B to effect the generation of the stored energy waveform. The stored energy waveform transfers from the rechargeable energy source 112 to the output PFNs 116A-B which is then received by the igniter plugs 106A-B to generate a spark for each igniter plug 106A-B.

In an alternative configuration of the ignition exciter circuit 102, the discharge switch 140 may be coupled across the high side of the ignition exciter circuit 102 from the cathode of the rectifier diode 226 to the cathode of the freewheeling diode 222.

Energy requirements of the engine ignition system 100 are specified to ensure sufficient energy delivery to generate a spark at the firing tip 120A-B of the igniter plug 106A-B for a range of starting scenarios. Ignition exciters may endure temperature extremes ranging from −55° C. to 150° C. Exposure to high temperatures (e.g. above 121° C.) may limit the use of silicon semiconductor components for power switching and conversion due to excessive leakage current. That is, leakage current, or current that passes through a solid-state switch when it is ideally non-conductive (i.e. switched "off"), increases in solid-state switches as a function of temperature. In semiconductor devices like solid-state switches, leakage current is a quantum phenomenon where mobile charge carriers (electrons or holes) tunnel through an insulating region in the semiconductor. The phenomenon increases with temperature. While small levels of leakage current allow a solid-state switch to be considered as non-conductive, excessive leakage current running through the solid-state device renders the device deficient or inoperable as a switch. For silicon semiconductors, the level of leakage current becomes excessive at about 121° C. and above. The incorporation of the silicon carbide thyristor as the solid-state switching device increases the high temperature capability of the discharge switch due to the inherent high temperature capability of the silicon carbide material. The increased capability is due to leakage currents that are on the order of 1/10 that of the conventional silicon material capability.

The technical effect is to maintain the spark rate during higher temperature operation where the leakage current of the solid-state switch increases with temperature. Consequently, silicon carbide thyristors may be used for ignition exciters designed for ignition systems with high spark energy requirements. Additionally, the grounded anode triggering circuit described above enables the implementation of either a single discharge circuit (that is, one output PFN) or the parallel dual discharge configurations (that is, multiple parallel PFNs) described above. The increased peak current capability of the silicon carbide thyristors (approximately three times that of conventional silicon devices) facilitates the delivery of a higher peak power during the sparking event at the igniter plug firing tip. The higher peak power is a preferred physical aspect to the spark plume required for the ignition of fuel within large turbine combustors. The level of peak power for the ignition event enables splitting the power delivery to two or more outputs as described with the multiple parallel PFNs. As such, solid-state discharge switches may be used in ignition systems for a large range of applications including gas turbine engines of large aircraft and industrial applications related to electrical power generation.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An ignition exciter system for igniting fuel in a gas turbine engine, the ignition exciter system comprising:
    a rechargeable energy source;
    at least one pulse-forming network coupled to the rechargeable energy source and generating a stored energy waveform from energy in the rechargeable energy source;
    at least one igniter plug coupled to the at least one pulse-forming network to receive the stored energy waveform and generating a spark in response to the received stored energy waveform;
    a silicon carbide discharge switch further comprising a gate, an anode and a cathode; and
    a switch driver applying a positive electrical triggering waveform to the anode with respect to the gate of the silicon carbide discharge switch;
    wherein the anode and cathode of the silicon carbide discharge switch is connected in series with the rechargeable energy source selectively coupling the rechargeable energy source to the at least one pulse forming network in response to the positive electrical triggering waveform to effect the generating of the stored energy waveform, which is then received by the igniter plug to generate the spark.

2. The ignition exciter system of claim 1 wherein the silicon carbide discharge switch is a silicon carbide thyristor.

3. The ignition exciter system of claim 2 wherein the anode is coupled to an electrical ground.

4. The ignition exciter system of claim 2 wherein the anode of the silicon carbide thyristor is coupled to a cathode of a diode and the cathode of the silicon carbide thyristor is coupled to an anode of the diode.

5. The ignition exciter system of claim 1 wherein the silicon carbide discharge switch selectively couples the rechargeable energy source to the at least one pulse-forming network by transitioning from a non-conducting state to a conducting state.

6. The ignition exciter system of claim 1 wherein the at least one pulse-forming network is configured to control a shape and a timing of a stored energy waveform.

7. The ignition exciter system of claim 1 wherein the at least one pulse-forming network comprises at least two pulse-forming networks electrically coupled in parallel.

8. The ignition exciter system of claim 1 wherein the stored energy in the rechargeable energy source is directed to the at least one igniter plug through the silicon carbide discharge switch.

9. The ignition exciter system of claim 1 wherein the rechargeable energy source comprises a capacitor.

10. The ignition exciter system of claim 1 wherein the rechargeable energy source comprises an array of in-parallel or in-series capacitors.

11. The ignition exciter system of claim 1 further comprising a clamper circuit electrically coupled in parallel between the in-series combination of the silicon carbide discharge switch and the rechargeable energy source.

12. The ignition exciter system of claim 1 wherein the silicon carbide discharge switch is at least two silicon carbide thyristors connected in series.

* * * * *